Sept. 1, 1942.  E. H. YOUNG  2,294,646
DOWN GRAIN GUARD FOR COMBINES
Filed March 28, 1942
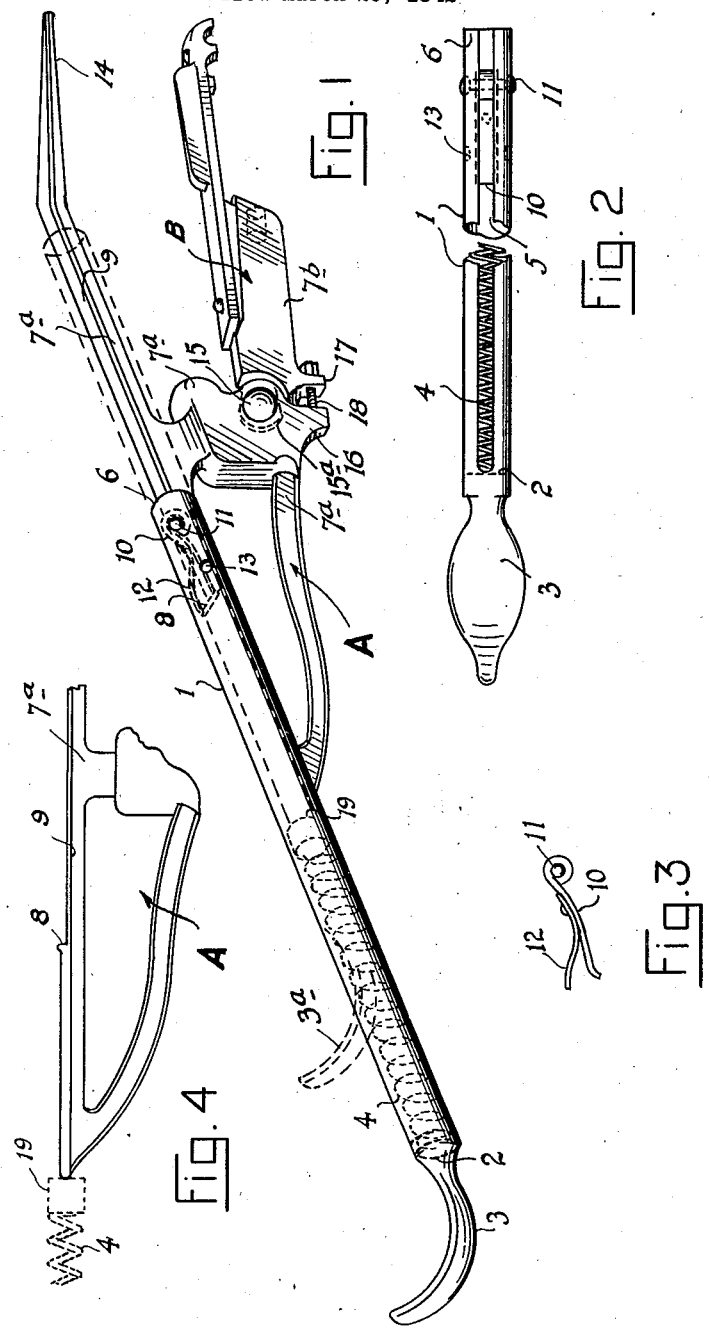
Inventor
Edward Henry Young,
by
ATTORNEY.

Patented Sept. 1, 1942

2,294,646

UNITED STATES PATENT OFFICE 2,294,646

DOWN-GRAIN GUARD FOR COMBINES

Edward Henry Young, Chancellor, Alberta, Canada

Application March 28, 1942, Serial No. 436,590
In Canada September 19, 1940

2 Claims. (Cl. 56—313)

This invention relates to an improved guard as used with combines for the harvesting of wheat and other kinds of crops with particular reference to the process of cutting of the crop.

It is an object of this invention to provide a less rigid type of guard than those conventionally in use as pick-up devices, and one that is longer in comparison with other types, and is also spring protected against the possibility of breakage from impact with rocks and other impeding obstacles on or partly below the surface of the ground.

This device is maintained at a comparatively low level during travel, with the result that it will pick up wheat stems that have fallen due to both physical and disease causes.

This down-grain pick-up feature is of particular importance in that it permits the operator of a combine to raise the cutting level of his machine, thereby topping the grain instead of cutting it low down the stem.

The device is an accessory, which may be readily and rapidly applied to the conventional short guard, and may also be quickly removed when not needed or for replacement.

With the foregoing and other objects in view, as will hereinafter become apparent, my invention comprises the following construction and combination of parts set forth and disclosed in the specification herewith within the scope of what is claimed and what is illustrated in the accompanying drawing.

In the drawing:

Fig. 1 is a perspective view of the telescopic guard.

Fig. 2 is an underside view of the tubular extension member, partly in section to show the internal spring.

Fig. 3 shows the dog catch and its spring in detail.

Fig. 4 shows the pointed end of the short guard with its locking ridge.

Similar numerals refer to similar parts throughout the several views.

In Figs. 1 and 4 the letter "A" indicates a short form of guard as conventionally used forward of the cutting members of a combine, with the exception that a ridge has been cut away partly along the upper flanged face, and the letter "B" indicates a modified form of the same guard shank end, the modification being the addition of a screw adjustment in order to be able to vary the angular disposition between "A" and "B".

In the present showing of my invention the same is specially constructed for use with a crop that is termed down-grain, which physical condition is due to a variety of causes in the harvesting period. The essential features of my invention show a device that operates for raising the stems of grain for better cutting by the reaping elements of a combine.

At a suitable position on the forward, or lead end of a short guard, such as "A", is mounted a barrel or tube 1, closed at one end 2 and at this end terminating in a leading manner in a spear-shaped prong 3, said prong having a slightly upward curvature. This upward curve enables the prong to ride over obstacles that may be encountered on or partly embedded in the ground that might impede its forward progress. The barrel 1 encloses a helical compression spring 4 for approximately two-thirds of the length of the barrel. The barrel 1 is slotted longitudinally on its under side as seen in Fig. 2, which slot runs from the closed leading end 2 to the opposite end 6 of the barrel forming a passageway to permit the barrel to ride slidably in telescopic manner over the conventionally flanged short guard member 7a of the combine. The short guard 7a is modified as mentioned by having a lateral ridge 8 resulting from the cutting away of the top flange of the guard in part. This cut away portion 9 in rear of the leading end is for the coaction of a dog catch member 10 pivot mounted on a cross pin 11 through the barrel 1 near its open end. This dog catch is held in locking position against the said ridge 8 by means of a spring 12 attached to the catch and contacting the inner face of the barrel 1 when the barrel is in its operating position on the guard 7a.

As the combine is advanced the specially long extension guard accessory member 1, mounted on the short guard member, travels low through the crop on account of this added length, in consequence of which the down-grain is raised from the surface of the ground gradually to a maximum supporting level for high cutting machine adjustment. The rate of travel of the combine may be speeded up as a result of such an adjustment since the bulk of the straw stalks gathered is less than with low level cutting, which low level cutting method has often to be resorted to in order to salvage part of the down grain.

In the event of clods of earth, rocks, or other impediments being encountered in the cutting process the barrel 1 will ride up the short guard flange 9 and compress the spring 4 in telescopic manner, and the upwardly curved and pointed end of the prong 3 will pass over t countered, thereby avoiding a bent or possibly broken guard unit. Should such an accident happen another barrel member 1 may readily be fitted.

For the removal of the extension member 1 the dog catch 10 is raised against its attached spring 12 by means of a small nail or similar pointed article which may be inserted into a hole 13 drilled laterally across the barrel 1 and positioned relatively to the dog catch for this particular purpose. The tail end 14 of the guard member 7a is tapered as shown in order to prevent overcrowding and consequent clogging of the grain stalks as they pass from this guard to the reel of the combine.

As mentioned the guard 7a—7b is of semi-conventional two-piece construction, the leading strut member 7a being pivoted with the aft shank member 7b at their junction by means of a hinge pin 15, the butt of the member 7a being slotted in the rear to receive a hinge tongue 15a projecting from the shank member 7b to form, with the pin 15, a knuckle joint between the two members 7a and 7b. The part 7a has a lug projecting from its under side numbered 16, and this lug is drilled and threaded to receive a set screw 18 which set screw passes through a lug depending from the shank 7b which combination is a means of adjusting the angular relationship of the two parts 7a and 7b, as may be necessary to obtain the most satisfactory pick-up angle for the down grain. This adjustment may function in a different manner by having the screw 18 butting against the lug 16 and screwably passing through the lug 17.

I claim:

1. A telescopically compressible down-grain pick-up extension guard for use on combine grain guards of the short type, comprising a longitudinally slotted barrel slidably engaging with the leading edge of a combine grain guard through the said slot, a compression spring within said barrel, a slidable block between said spring and said short guard to act as a buffer between spring and guard, a spring controlled dog catch mounted within said barrel to hold the barrel in position with respect to said short guard, said barrel having a hole to permit insertion of means for release of said dog catch for removal of the barrel, and a down-grain pick-up pointed prong at its leading end, and a transverse ridge on the upper face of said short guard to contact said dog catch.

2. A guard for combines with short grain guards, comprising a shank member attached to the cutting bar of the combine, a forward strut member hingedly coacting with said shank member, screw means for angular adjustment between said hinged members, in combination with a longitudinally slotted tubular shaped down-grain pick-up extension guard slidably engaging as a barrel said hinged guard forward strut member by means of a longitudinal flange along the upper arm of said strut member, a helical spring within said barrel, a block between said spring and said strut member to act as a buffer during spring compression between the spring and the strut member, a dog catch pivotally mounted within said barrel, a spring to hold said dog catch within said barrel, a ridge transversely disposed on the upper face of said strut member to contact said dog catch for holding said barrel on said strut member, under the influence of said dog catch spring, the said barrel having a hole to permit insertion of means for release of said dog catch for removal of said barrel, and a down-grain pick-up prong attached to the leading end of said barrel.

EDWARD HENRY YOUNG.